US006929814B2

(12) United States Patent
Bouwmeesters et al.

(10) Patent No.: US 6,929,814 B2
(45) Date of Patent: Aug. 16, 2005

(54) PROCESS FOR PREPARING BEADS AS FOOD ADDITIVE AND PRODUCT THEREOF

(75) Inventors: Johnny Franciscus Bouwmeesters, Oetwil am See (CH); Kris Bart De Roos, Wetzikon (CH)

(73) Assignee: Givaudan SA, Vernier (CH)

( * ) Notice: Subject to any disclaimer, the term of this patent is extended or adjusted under 35 U.S.C. 154(b) by 218 days.

(21) Appl. No.: 10/191,687

(22) Filed: Jul. 9, 2002

(65) Prior Publication Data

US 2003/0082272 A1 May 1, 2003

Related U.S. Application Data

(63) Continuation of application No. 09/269,822, filed as application No. PCT/EP97/05517 on Oct. 8, 1997, now Pat. No. 6,436,461.

(30) Foreign Application Priority Data

Oct. 9, 1996 (EP) ............................................. 96202823

(51) Int. Cl.⁷ ....................... A23L 1/052; A23L 1/0524; A23L 1/0532
(52) U.S. Cl. ........................ 426/575; 426/576; 426/577
(58) Field of Search ........................... 426/3, 573, 575, 426/576, 577

(56) References Cited

U.S. PATENT DOCUMENTS

| | | | |
|---|---|---|---|
| 3,930,026 A | 12/1975 | Clark | 426/3 |
| 4,389,419 A | 6/1983 | Lim et al. | 426/72 |
| 4,507,327 A | 3/1985 | Ueda | 426/276 |
| 4,695,463 A | 9/1987 | Yang et al. | 424/440 |
| 4,702,921 A | 10/1987 | Ueda | 426/48 |
| 5,139,783 A | 8/1992 | Handjani et al. | 424/401 |
| 5,158,798 A | 10/1992 | Fung et al. | 426/602 |
| 5,456,937 A | 10/1995 | Chalupa | 426/573 |
| 5,536,519 A | 7/1996 | Graf et al. | 426/534 |
| 5,603,955 A | 2/1997 | Gehrke et al. | 424/484 |

FOREIGN PATENT DOCUMENTS

| | | |
|---|---|---|
| EP | 0 221 850 | 5/1987 |
| EP | 0242135 | * 7/1990 |
| EP | 0 391 803 | 10/1990 |
| EP | 0 437 360 | 7/1991 |
| EP | 0 464 324 | 1/1992 |
| EP | 0490559 | * 6/1992 |
| EP | 0 490 559 | 6/1992 |
| EP | 0528466 | * 4/1995 |
| GB | 2 086 835 | 5/1982 |
| HU | 193650 | * 7/1985 |
| WO | WO 93/19621 | 10/1993 |
| WO | WO 93/19622 | 10/1993 |
| WO | 96/28244 | * 9/1996 |

OTHER PUBLICATIONS

P. Brodelius and K. Mosbach, *Immobilized plant cells*, Adv Appl Microbiol, 28, 1–26 (1982).

A.C. Hulst, et al., *A new technique for the production of immobilized biocatalyst in large quantities*, Biotechnol Bioeng 27, 870–876 (1985).

A.B. Pepperman, et al., *Alginate controlled release formulations of metribuzin*, J Controlled Release 17, 105–112 (1991).

H. Provost, et al., *Continuous yoghurt production with Lactobacillus Bulgaricus and Streptococcus Thermophilus entrapped in ca–alginate.*, Biotechnol Lett 7 (4) 247–252 (1985).

K. Saito, et al., *Stability of carthamin in calcium alginate beads*, Food Chem 50, 311–312 (1994).

T. Shiotani and T. Yamane, *A horizontal packed–bed bioreactor to reduce carbon dioxide gas holdup in the continuous production of ethanol in immobilized yeast cells*, Eur J Appl Microbiol Biotechnol 13 (2) 96–101 (1981).

H. Tomida, et al., *Preparation of theophylline–loaded calcium alginate gel capsules and evaluation of their drug release characteristics*, Chem Pharm Bull 41 (12) 2161–2165 (1993).

* cited by examiner

*Primary Examiner*—Arthur L. Corbin
(74) *Attorney, Agent, or Firm*—Wood, Herron & Evans, L.L.P.

(57) ABSTRACT

Beads as food additive consisting of a matrix of a reticulated multivalent cation containing acid polysaccharide and at least one water soluble and/or volatile liquid or solid active ingredient filling at least partly the voids built by the acid polysaccharide are prepared by a process comprising the steps of forming a system consisting of a dispersion or emulsion of a water immiscible material in an aqueous solution of an acid polysaccharide, especially in the form of an alkali metal salt, an emulsifier and, optionally, one or more other water soluble or water dispersible substances; forming of discrete droplets of said system; converting said droplets to water-insoluble gel beads by introducing said droplets in an aqueous or alcoholic solution containing multivalent cations, thereby building a suspension of gel beads; isolating said gel beads from said suspension; optionally, drying the isolated beads, and loading the isolated beads with at least one active ingredient. The active ingredient is at least one compound of the group consisting of flavors, fragrances, vitamins or coloring materials.

26 Claims, No Drawings

PROCESS FOR PREPARING BEADS AS FOOD ADDITIVE AND PRODUCT THEREOF

This application is a continuation of Ser. No. 09/269,822 filed on Jun. 28, 1999 now U.S. Pat. No. 6,436,461 which is a 371 of PCT/EP97/05517 filed Oct. 8, 1997.

BACKGROUND

The present invention relates to a process for preparing beads as food additive containing at least one active ingredient, to a method of use of the beads and to the beads themselves.

A frequent problem associated with the application of flavor systems is the loss of flavor by volatilization or chemical decomposition. The harsh environment of some food processes like baking, extruding, retorting and deep frying, to name a few, create unique problems for the survival of flavors in finished food products. The loss of flavor usually results in flavor profile distortion or even in complete loss of flavor. Therefore, food scientists and application specialists are continuously searching for methods to protect flavors against volatilization and decomposition during processing.

Another category of flavor application problems results from differences in the interaction between the flavor compounds and the product base. These differences in the flavor-matrix interactions result also in flavor distortion due to the different rates of flavor release during consumption of the product. Typical examples of this type of flavor application problems are the change of flavor character and strength in chewing gum during mastication and the flavor imbalance observed when applying standard flavors to low fat products.

One of the preferred methods to control flavor retention and release is encapsulation. A considerable amount of effort has been devoted for many years to provide solid particulate flavoring materials in which a flavor is contained in the particulate matrix. Various attempts have been made to fix the flavors in many different types of organic matrices to provide stable free-flowing powders of particles which contain the flavor for flavor release when incorporated in foods. Several principle technologies have been proposed for the preparation of solid particulate flavoring materials.

SUMMARY

The first category of encapsulated flavors consists of water-soluble particles containing a dispersion of flavor oil. A number of water-soluble carrier materials are employed in the production of this type of encapsulated flavors, such as sugars, modified starches and gums. The industry commonly utilizes spray drying, extrusion and fluidized bed coating to produce the particles. Flavors encapsulated in a water-soluble matrix can be used for controlling flavor delivery and improving flavor stability in dry products such as chewing gum, pressed tablets and dry mixes for the preparation of instant soups, beverages, sauces and desserts. However, this type of encapsulation is unsuitable for improving flavor performance in products that contain water because of dissolution of particulate flavoring materials. Since in the preparation of most foods, water is involved at any stage of the processing, encapsulation in water-soluble matrices has limited applicability for improving flavor stability or for controlling flavor retention and release.

To overcome the problem of dissolution of the capsule matrix during processing in moist environment, fat encapsulation is sometimes being used (second category). However, the use of fat encapsulated flavors is limited to food products that are processed at relatively low temperatures, because at temperatures above the melting point of the fat much of the effectiveness of the encapsulation is lost. In practice, this means that fat encapsulation can not effectively be used for controlled flavor delivery in products that are heated above 80° C. which comprises the majority of products that is boiled, baked, roasted, (deep) fried or extruded.

The third category of encapsulated flavors consists of particles that are water insoluble and heat stable. The methods currently being used to prepare such particles are micro-encapsulation by coacervation and encapsulation in microorganisms.

The encapsulation of flavor oils in heat-stable water-insoluble coacervation microcapsules is described in the patent applications WO 93/19621 and WO 93/19622. Micro-encapsulation by coacervation creates a barrier of protein around a droplet of flavor oil. This barrier provides improved flavor retention during heat processing and higher shelf-life stability. Moreover, it can provide improved flavor performance through enhanced flavor release during consumption as, for example, in chewing gum. The coacervation microparticles release the flavor by fracturing the protein membrane surrounding the flavor oil during mastication. For optimum results, it is important that the capsules are "engineered" for high flavor retention during processing without adversely affecting flavor release.

The encapsulation of flavor oils in microorganisms is described in European patent application 242,135. This method of encapsulation provides particles, each consisting of a droplet of oil surrounded by a double layer consisting of a cell membrane and a capsule wall. The application of microbial cells for enhanced flavor release from chewing gum has been described in European patent application 528 466. The results of the organoleptic evaluations indicate that the flavor release is by fracturing. In this and other respects, the behavior of microbial cells resembles that of coacervation microcapsules.

Both microbial cells and coacervation microcapsules are able to survive food processes like baking, extruding, retorting and deep frying. The major risk for this type of capsules is that they are ruptured during the process as a consequence of the shear forces applied during mixing, grinding or other high-shear processes to which the product is subjected during its production.

Other potentially interesting materials for the preparation of heat stable, water-insoluble flavor microparticles are salts of anionic polysaccharides such as the calcium salts of alginic acid, pectin and gellan gum. Calcium alginate, in particular, has found useful application as a water insoluble matrix for the encapsulation of microbial cells (T. Shiotani and T. Yamane, Eur. J. Appl. Microbiol. Biotechnol. 13 (2) 96–101 [1981], H. C. Provost, Divies and T. Rousseau, Biotechnol. Lett. 7 (4) 247–52 [1985]), enzymes (P. Brodelius and K. Mosbach, Adv. Appl. Microbiol. 28, 1 [1982]), drugs (H. Tomida, C. Mizuo, C. Nakamura and S. Kiryu, Chem. Pharm. Bull. 41(12) 2161–2165 [1993]), vitamins (U.S. Pat. No. 4,389,419), colorings (K. Saito, T. Mori and K. I. Miyamoto, Food Chem. 50, 311–312 [1994]), and herbicides (A. B. Pepperman, J. C. W. Kuan and C. McCombs, J. Controlled Release 17, 105 [1991]). However, for the encapsulation of flavors, calcium alginate or other heat stable polysaccharides have hardly been used. This is not surprising in view of the poor barrier properties of these gels for flavor compounds.

The use of alginate for controlled flavor delivery is described in European patent application 221,850. According to this encapsulation in calcium alginate is used for controlled delivery of water-insoluble flavors from chewing gum. The process for encapsulation involves separation of the alginate matrix from a large excess of water followed by air drying. Therefore, this process is not suitable for encapsulation of water-soluble and volatile flavors, because these compounds either remain in the aqueous phase or volatilize during drying. Moreover, the approach does not allow control of flavor release by variation of particle size, porosity and flavor solvent composition.

While the above methods for the preparation for heat-stable, water-insoluble capsules allows improvement of flavor retention under harsh conditions, there are a few restrictions that limit a wider application of these technologies. For example, with the above methods, flavors of high volatility and water-solubility can not be encapsulated or only with poor efficiency. Moreover, most particles consisting of a core surrounded by a shell of capsule material can not withstand high shear conditions with the consequent risk of premature release by capsule breakage.

In the copending European patent application number 96 20 2822 the production and use of flavors and other active ingredient(s) encapsulated in moist alginate beads that meet some the above demands have been described. Although the method gives good results with poorly volatile and water insoluble flavors, the encapsulation efficiency is often poor with water soluble and volatile flavor compounds. Therefore, it would be advantageous to have an alternative method of flavor and other active ingredient(s) encapsulation that allows encapsulation of water soluble and/or (very) volatile flavor and/or other active ingredient(s) constituents at high efficiency and that shows similar or even better performance in the application. An object of the present invention is to fulfill this demand.

The demand is fulfilled by beads consisting of a matrix of a reticulated multivalent cation containing acid polysaccharide and at least one water soluble and/or volatile liquid active ingredient and/or one water soluble and/or volatile solid active ingredient filling at least partly the voids built by the acid polysaccharide. The active ingredient is at least one compound of the group consisting of flavors, fragrances, vitamins or coloring materials. Especially the active ingredient is a liquid or solid flavor, in particular a flavor oil, or a flavor dissolved in oil. Said multivalent cation containing acid polysaccharide may preferably be an alginate, especially calcium alginate. Said acid polysaccharide may be a pectin, especially a low ester pectin, preferably with a degree of esterification of less than 5% by weight. The acid polysaccharide may also be gellan gum. The beads are heatstable and the active ingredient is being sustainedly released. Further, the beads are mechanically stable and have a diameter of about 10 to about 5000 μm, preferably of 100–1500 μm, specifically of 400–1200 μm.

The beads can be prepared by the following process:

A process for preparing beads as food additive containing at least one water soluble and/or volatile active ingredient which is released at a controlled rate, said process comprises the steps of:

a) forming a system consisting of
   a dispersion or emulsion of a water immiscible material in an aqueous solution of an acid polysaccharide, especially in the form of an alkali metal salt, an emulsifier and,
   optionally, one or more other water soluble or water dispersible substances;

b) forming of discrete droplets of said system;

c) converting said droplets to water-insoluble gel beads by introducing said droplets in an aqueous or alcoholic solution containing multivalent cations, thereby building a suspension of gel beads;

d) isolating said gel beads from said suspension, e) optionally, drying the isolated beads, and f) loading the isolated beads with at least one active ingredient.

The active ingredient is at least one compound of the group consisting of flavors, fragrances, vitamins or coloring materials.

In the process the water immiscible material is a lipid, in particular a vegetable oil, a fat, a mono- or diglyceride, or a lipophilic fat replacer, especially a sucrose polyester. Said acid polysaccharide in the form of an alkali metal salt is preferably as an alginate, especially sodium alginate. Said acid polysaccharide may be a pectin, especially a low ester pectin, preferably one having a degree of esterification of less than 5% by weight. The acid polysaccharide may also be gellan um. The emulsifier may be a modified starch, especially an octenyl succinated starch. The water-soluble substance may be a polysaccharide, preferably the polysaccharide is at least one of the group consisting of maltodextrin, modified cellulose, especially methyl or ethyl cellulose, locust bean gum, dextran, gum arabic and konjac. A protein as the water-soluble substance is also preferred. The water-dispersible substance may be an adsorbent, especially silicon dioxide. The multivalent ions may be ions out of the group consisting of calcium, strontium, barium, iron, silver, aluminium, manganese, copper and zinc, especially calcium ions.

Said forming of discrete droplets may be generated by a spraying method known per se, especially by pouring the system on a rotating disk, or by extruding or pumping said system through an orifice or a needle at a rate slow enough to prevent the formation of a jet, or by building a jet of said system and breaking up said jet by means of a resonance technique known per se, e.g. vibration or pulsation.

The beads may be isolated from the suspension by filtration or centrifugation, thereby yielding moist beads, which beads may be dried, especially in an oven or fluid bed dryer. Preferably the moist beads are dried/in the presence of an anti-caking agent, especially in the presence of starch, maltodextrine or silicon dioxide. Said loading of the moist or dry beads with at least one active ingredient is advantageously performed by contacting the active ingredient(s) with the moist beads at room or elevated temperature and allowing the active ingrdient(s) to be absorbed or adsorbed into the beads.

The beads according to the invention which are preferably prepared by the afore described process can be used in a method for flavoring, perfuming, vitaminizing or coloring food which comprises adding the beads to the food in an effective amount, whereby the addition of the beads to the food can be performed prior to or during an extruding step of the food product or by coating the food with said beads or even prior to drying, frying, baking, cooking or boiling the food because of their mechanically stability. Adding flavor containing beads to no- or low-fat dry mixed which are used for the production of flour-based food are of specific interest and therefore this method is one of the preferred ones. Further preferred is the addition of the beads to a low fat version of a regular food product.

DETAILED DESCRIPTION

The present invention provides a method for encapsulating water soluble and/or volatile flavors, vitamins, coloring materials and other active ingredients into a water insoluble, heat stable polysaccharide matrix in such way that the performance of the encapsulated ingredient in the application is improved by reducing the risk of flavor loss by volatilization or chemical decomposition during (heat) processing, and or by enhancing or modifying the-flavor release during consumption of the food. The method allows encapsulation of water soluble and highly volatile flavor ingredients, such as acetoin and diacetyl at high efficiency.

The invention is directed to a method for encapsulating flavors and/or also other active ingredients in microparticles for optimum active ingredient performance in foods. More particularly, it is directed to a method of producing edible microparticles comprising a matrix of essentially water-insoluble shape-retaining alginate gel held together by salt bridges. In the preferred embodiment of the invention, the process consists of the following steps:

Production of a suspension or slurry of gel particles, in particular, gel beads, consisting of a multivalent cation containing acid polysaccharide and containing a water-insoluble flavor solvent.

Isolation of the gel beads from the slurry by filtration or centrifugation.

Optionally, dehydration by oven or fluid bed drying, and,

Absorption of the flavor into the gel beads.

In this application beads are defined as solid particles with a homogeneous composition and texture from inside to outside in which the flavor droplets or particles are uniformly distributed. Capsules, on the other hand, are defined as particles consisting of a liquid or solid core of the active ingredient surrounded by a shell.

The dry encapsulation process according to the invention overcomes the difficulties encountered in the encapsulation of water-soluble flavors when using the above described wet slurry technologies of coacervation and absorption into microorganisms.

Flavor microparticles produced according to the invention substantially retain their structural integrity in food processes thus allowing effective protection of the flavor ingredients against volatilization and decomposition. If the active ingredient is a flavor, the flavor microparticles provide sustained release of the flavor to the finished product during storage and prior to consumption. The method accordingly provides a inexpensive method to enhance flavor effectiveness by preventing flavor loss and/or enhancing flavor release.

The production of the flavor microparticles starts with the preparation of an emulsion consisting of a dispersed oil phase in an aqueous solution of an alkali metal alginate. The oil phase may consists of a vegetable oil, a molten fat or any other lipid material that has good flavor solvent properties and is suitable for human ingestion. Optionally, an emulsifier and an extender or filler material may be added. Non-volatile, poorly water-soluble flavor ingredients may also be added at this stage.

Subsequently, the emulsion is dripped or sprayed into an aqueous or alcoholic solution of multivalent cations which are especially calcium ions, to convert the droplets into shape retaining, water-insoluble gel microparticles. The gel particles are isolated from the resulting suspension or slurry of gel beads by filtration or centrifugation. The resulting moist flavor microparticles may be mixed with an anti-caking agent to obtain a free flowing product. Optionally, this product may be further dried at atmospheric or reduced pressure to obtain a product with a minimum amount of residual water and/or alcohol. The microparticles thus produced are mechanically stable.

The dried "blank" gel beads are loaded with flavor by mixing the flavor with the beads. The flavor is allowed to be absorbed or adsorbed into the beads which might take a few days. This results in a uniform distribution of the flavor over the beads. The major part of the equilibration may also take place in a package. To accelerate the absorption of flavor compounds into beads, in particular those containing solid fat, the beads may be equilibrated at elevated temperature.

The present invention provides a cost-effective process for the efficient encapsulation of volatile and water-soluble flavors. The process allows encapsulation of flavorings of different consistency, water-solubility and volatility. Further, the process allows manipulation of flavor retention and release by use of filler materials, adsorbents or flavor solvents with different melting point. Also, the present invention provides a process for preparing colored particles by the addition of a coloring material to the above process.

The present invention provides micro-beads with a unique combination of desirable properties. The particles may have different shape varying from beads to fibers and can contain different concentrations of flavor oils and/or solid flavor materials, varying from less than 1 to more than 80% by weight. The microparticles of this invention can much better withstand the harsh conditions during food processing than any other microcapsules currently being used for flavor encapsulation. For example, the gel beads are heat and freeze stable both in dry and moist environment. Moreover, they can withstand high shear conditions. For all these reasons, the micro-beads are particularly suited for use in products that are subjected to high shear and heat stress during their production.

In the preferred embodiment of the invention, an alkali metal alginate, preferably sodium alginate, is dissolved in water to produce a solution containing between about 1 and 5% by weight of the alginate. All hereafter mentioned percent values are percent values by weight. Concentrations of alginate below about 0.5% are increasingly ineffective in producing defect-free micro-capsules. Alginate concentrations above 4%, although desirable for reasons of encapsulation effectiveness, are often too viscous to allow formation of small beads of uniform size. Instead of an alkali metal alginate, pectin or gellan gum may also be used in this process.

Alginates are linear copolymers of a-L-guluronate (G) and b-D-mannuronate (M). The alginate chain may be regarded as a block copolymer consisting of "G-blocks" (homopolymeric regions of guluronate residues) "M-blocks" (homopolymeric regions of mannuronate residues) and "MG blocks" (copolymeric regions of a random-like alternating sequence of M and G) of varying length. Besides being heterogeneous with respect to the chemical composition, alginates have quite a broad molecular weight distribution. Alginate is a collective term for a family of polymers. Their properties depend on their block structure and molecular mass.

Above a certain critical molecular mass the properties of the alginates are mainly governed by the monomeric composition and block structure. In general, an increase in the content of guluronate gives mechanically stronger gels with enhanced stability in the presence of non-gelling/anti-gelling ions (e.g. $Na^+$, $Mg^{2+}$) and calcium sequestering agents. High guluronate containing gels exhibit high porosity and low shrinkage during gel formation. At high content of mannuronate, the gels become softer and more elastic; they shrink more during gel formation with concomitant reduction of porosity. For encapsulation of flavors, all types of alginate can be used but those with a molecular weight are generally preferred because it turned out that they are more effective because of their high mechanical stability.

Instead of sodium alginate, the structurally related pectin may be used for the production of water insoluble, heat stable gel beads. Pectin is a hydrocolloid consisting of polygalacturonic acid of which the carboxylic acid groups are partly esterified with methanol. For high heat stability, the use of a pectin with a low degree of esterification, especially less than 5%, is preferred.

Gellan gum is a high-molecular-weight heteropolysaccharide consisting of a linear tetrasaccharide repeat structure comprising 1,3-β-D-glucose, 1,4-β-D-glucuronic acid, 1,4-β-D-glucose and 1,4-α-L-rhamnose. It forms gels with several counter ions of which the divalent ions, such as calcium and magnesium, give maximum gel hardness. Gels formed in the presence of calcium ion concentrations higher than 10 mM are heat stable under normal food processing conditions.

The relatively large pore size of the heat stable polysaccharide gel beads restricts the capability of alginate gels to act as an insurmountable barrier for small molecules, such as flavor molecules, vitamins, etc. Nevertheless, an alginate gel may sustain the release of molecules to a different extent depending on the barriers within the gel. If for example, the gel contains other (macro)molecules, the effective porosity will decrease and the sustained release will be at a lower rate. For this reason, it is sometimes advantageous to add a filler material such as native starch or silicon dioxide to the alginate solution. Other suitable filler materials include polysaccharides such as dextrins, dextran, locust bean gum, gum arabic and methyl cellulose, ethyl cellulose, hydroxypropyl cellulose and proteins, such as gelatine.

In addition to filler materials, emulsifiers, such as octenyl succinated starch and mono- and diglycerides, or mixtures of mono- and diglycerides, may be added to the aqueous solution of the acid polysaccharide. These emulsifiers help to obtain an oil-in-water emulsion of high stability which is a prerequisite for the formation of beads of constant composition and size.

Next, vegetable oil, fat or any other suitable water-insoluble flavor solvent to be incorporated into the microbeads is added to the aqueous solution, typically on the range of about 2–25%. Among the water-insoluble flavor solvents useful in the practice of the invention are vegetable oils, solid fats of different melting point and mono- or diglycerides. For application in low- and no-fat products, a lipophilic fat replacer, for example, a sucrose polyester such as Olestra® (Procter & Gamble), may be used. At this stage, also water-insoluble flavor carriers like silicon dioxide may be added as well as coloring materials and non-volatile flavor ingredients, such as aspartame or capsaicin.

The resulting two phase system is subjected to rapid stirring to induce emulsification of the oil phase in the aqueous phase. A homogenizer or another high shear mixing apparatus is useful for this step. Preferably, the resulting particle or oil droplet size in the emulsion is in the 1–10 micrometer range to ensure good stability of the suspension or emulsion during at least the period of bead formation (up to a few hours). After formation of the emulsion, the gel particles are being prepared using one of the following methods.

One of the preferred methods of gel bead production consists of generating droplets by spraying using a nozzle or disk and collecting the droplets, while substantially spherical, in a multivalent cation containing solution, e.g., an aqueous or alcoholic solution of calcium chloride. The droplets are of a size preferably within the range of about 100–5000 micrometers. As the droplets enter the solution, the alkali metal counter-ions of the acid polysaccharide are exchanged by calcium ions, resulting in instantaneous gelation of the droplets through the formation of multiple salt bridges between the acid polysaccharide molecules.

Another method of droplet generation consists of extruding or pumping the emulsion through a needle or orifice at a speed slow enough to prevent the formation of a jet. This method provides beads of very uniform size but the production capacity is low. Much higher capacity is achieved by making use of a resonance technique which consists of breaking up a jet of the emulsion into uniform droplets by means of a resonanation (A. C. Hulst, J. Tramper, K. van't Riet and J. M. M. Westerbeek, Biotechnol. Bioeng. 27, 870–876 [1985]). Therefore, the latter method is preferred for the large-scale industrial production of the gel beads.

Still another method for the production of polysaccharide gel microparticles consists of preparing a gel using mixtures consisting of a sodium salt of an acid polysaccharide and one other gel forming polymer such as agar, and to break the gel into small particles by shear. Subsequently, a concentrated solution of calcium chloride is added to convert the water soluble salt of the acid polysaccharide into an insoluble calcium salt in order to obtain microparticles of high heat stability. The particles obtained by this method have an irregular shape which might be an advantage in some applications. In principle, particles of any shape can be used for the flavor encapsulation provided that the dimensions are not that extreme that the flavor retention and release are adversely affected.

Calcium ions in the concentration range of 1–10% are the preferred multivalent cations for alginate gelation because of their high effectiveness, low costs and low toxicity. In principle, other metal ions such as strontium, barium, iron, silver, aluminum, manganese, copper or zinc ions may also be used. When the calcium chloride meets the drops of the acid polysaccharide, a skin of insoluble calcium alginate forms at once on the outside. Thereafter, calcium ions diffuse slowly into the drops and so a reasonable time is necessary for full conversion to solid gelled particles. For drops of a diameter of 100–5000 micrometers, and a calcium chloride solution of 1–5%, the contact time should be from 1 to 500 minutes.

When calcium ions diffuse into the solution of the acid polysaccharide, the rapid ion-binding and network formation produces an inwardly moving gelling zone. The acid polysaccharide itself will also diffuse towards this gelling zone, leading to a depletion of polysaccharide in the center. A gel bead with such an inhomogeneous distribution of alginate may be advantageous for certain flavor applications because of the higher gel strength in the outer zone. In fact, in this way capsules may be formed consisting of an alginate shell around a droplet of flavor oil. In general, low molecular mass alginate, low concentration of gelling ions and absence of non-gelling ions give the highest inhomogeneity, whereas a high molecular weight polysaccharide, and a high concentration of non-gelling ions all give increased homogeneity.

The preferred solvents for the solution of multivalent cations are water and/or a low molecular weight alcohol such as methanol, ethanol and isopropyl alcohol. Higher molecular weight alcohols may also be used, but the low molecular weight alcohols are preferred because they can be removed more easily from the micro-beads by volatilzation. In general water is the preferred solvent. However, if a water soluble filler material is being used, alcohol is the preferred solvent because it precipitates the water-soluble filler within the gel matrix.

The microparticles prepared by one of the above methods can be isolated from the slurry by filtration or centrifugation. Optionally, they are washed with water, alcohol or a mixture of water and alcohol to remove adhering sodium and calcium salts. To obtain a free flowing product, starch, silicon dioxide (e.g. Syloid®), maltodextrin or any other water binding material can be added after isolation. Since different combinations of flavor (solvent) and acid polysaccharide cause different shrinkage during drying, the volume of flavor oil in the original emulsion should be optimized for different polysaccharide in order to obtain dry particles with little surface oil and a minimum tendency to stick together.

The water insoluble gel particles consisting of a porous gel network containing entrapped flavor solvent, are loaded with flavor by mixing the liquid flavor with the particles while tumbling over in a blender or dryer. If the particles contain solid fat, it might be advantageous to use slightly elevated temperature to enhance the rate of flavor diffusion into the particles. When most of the flavor has been absorbed by the particles and the particles do no longer have a strong tendency to stick together, they are transferred into bottles or drums where they are allowed to equilibrate for a few days to achieve uniform distribution of the flavor over the beads by migration. If the beads remain sticky, additional starch or other anti-caking agent is added to obtaining a free flowing product.

A variety of flavors and flavor ingredients may be encapsulated in the gel microparticles. These flavors include flavor compounds, and complex mixtures like extracts, essential oils, oleoresins or reconstituted natural, nature-identical or artificial flavors. Natural extracts, essential oils and oleoresins include fruit essences, vanilla extract, capsicum oleoresin, pepper oleoresin, cinnamon oil, oil of winter green, peppermint oil, bay oil, thyme oil, spearmint oil, cassia oil, citrus oils, and the like. Reconstituted natural, nature-identical and artificial flavors include apple, cherry, strawberry, peach as well as meat, cheese, tomato and butter flavors. These flavorings may be used individually or in a mixture as is well known in the art.

The heat-stable, sustained-release polysaccharide gel beads as obtained by the processes according to the invention may be employed to improve flavor impact in a wide, variety of food applications. For instance, encapsulation in a multivalent cation containing acid polysaccharide matrix may-be used to protect the flavor against volatilization and chemical decomposition during heat processing. The term heat-stable as used herein means protected against deteriorating effects of heat under dry and/or moist conditions. The heat-stable polysaccharide microparticles are particularly suited for improving flavor retention in solid or semi-solid foods during microwave heating, boiling, cooking, baking, frying, roasting, drying, and extrusion. Moreover, they are able to protect flavors in liquid products like soups and sauces against chemical decomposition or volatilization during retorting, boiling, pasteurization or sterilization.

Dried gel microparticles are preferred for use in products that require heat processing to produce the finished product. In such applications, the performance of dry microparticles is much superior to the performance of wet microparticles such as slurries and filtered beads (moisture content more than 50%), and slightly superior to microparticles isolated by centrifugation (moisture content of stach coated beads 15–20%). Study of the relationship between flavor loss during heat processing and the steam volatility of the flavor constituents strongly suggests that steam distillation from the microenvironment of the moist flavor beads is the major cause of the flavor losses from moist gel particles. Since dry calcium alginate does not easily rehydrate, a low moisture microenvironment is maintained around the flavor during the initial period of the heat processing thus resulting in the superior performance of the dry alginate beads as compared to the wet beads.

One of the major advantages of use of flavor encapsulation in water insoluble polysaccharide microparticles is that the encapsulation does not adversely effect flavor release during consumption. One of the reasons for this is that the microparticles provide sustained release of the flavor to the product during storage and prior to consumption. Another reason is that the flavor release from the beads is as good as or even better than the release from the food matrix in which the unencapsulated flavor constituents are entrapped. The release can be influenced by varying the flavor solvent, the filler materials, the type of acid polysaccharide used and the conditions used for formation of the alginate gel particles. For example, the time-intensity profile of flavor release can be influenced by varying the conditions of the gelation with calcium, e.g., by changing the calcium ion concentrations or the duration of gel formation. Because of their ability to influence flavor release, the alginate microparticles are also particularly suited for use in chewing gum and low fat products such as low fat ice cream.

A well known problem with chewing gum is the large difference in the interaction between flavor compounds and the gum base which results in very different rates of flavor release. This might result in undesirable changes during chewing. Moreover, the strong retention of most flavor compounds by the gum base results in a very slow level of flavor release and flavor perception in spite of the high flavor concentrations present in the gum base. Flavor encapsulation in water insoluble gel particles provides improved flavor release from chewing during mastication. Both the flavor impact (strength and character) and the time-intensity profile of the flavor release may be influenced by proper choice of flavor solvent, alginate type and filler materials.

Because of their ability to influence flavor release, the water insoluble polysaccharide gel particles are also particularly suited for use in low fat products such as low fat ice cream. An example of poor taste perception in low fat products is vanilla ice cream. The reduction of the fat content in ice cream results in distortion of the vanilla flavor profile due to the effect of the fat on flavor release. Moreover, it results in poor flavor stability (U.S. Pat. No. 5,536,519). Encapsulation in a water insoluble, fat or oil containing polysaccharide matrix helps to improve flavor performance by the creation of a microenvironment surrounding the flavor that mimics the original full fat base. Best results are obtained with flavor solvents that are solid at low temperature but fluid at the temperature in the mouth during the consumption of the ice cream. The advantage of encapsulation in a polysaccharide matrix over fat encapsulation is that free flowing flavor microparticles can be prepared from oils or fats of low melting point without the need of low temperature storage.

The following examples illustrate the practice of this invention and its preferred modes. It will be understood, however, that these examples are not intended to limit the scope of the invention.

EXAMPLE 1

Sodium alginate (type Protanal LF 20/60 ex Pronova or FD 155, Grinsted; 8.22 g) was dissolved in demineralized water (300 g) with stirring to produce a homogeneous aqueous solution. Capsul (4.5 grams) was added and stirring was continued till a homogeneous phase was obtained.

Subsequently, miglyol (99.9 grams) was added to the solution and the two-phase mixture was emulsified by vigorous stirring with an Ultra-Turrax apperatus to form a stable oil-in-water emulsion. The emulsion was fed through a vibrating needle of 1.22 mm internal diameter disposed about one inch above the lowest point of an eddy that was generated in a glass beaker by vigorous stirring 441 mL of a 1.6% solution of calcium chloride dihydrate in water. The flow rate through the needle was adjusted to prevent the formation of a jet. The emulsion droplets, upon entering the calcium chloride solution, immediately gelled to yield particles of about 800 micrometer diameter. After completion of the addition, the slurry of beads was allowed to stand for 16 hours to ensure complete penetration of the calcium ions into the beads.

The beads were isolated by filtration. Prior to filtration, the slurry of beads was sometimes sieved in order to obtain a fraction of uniform particle size (710–1000 mm) for comparative performance tests. The filtered beads (moisture content 50–55%) were dried in an oven at reduced pressure at room temperature to yield a dry product. The particle size of the dry beads produced by this method is in the range of 500–1000 mm.

Before doing application tests with the alginate beads, the particle size of the wet beads in aqueous slurry was measured by Coulter Counter LS 200 particle size analyzer. The particle size given in the Examples is the modal value for the wet beads in aqueous slurry, unless specified otherwise. The particle size of the dry beads was measured in suspension in propylene glycol.

The alginate gel beads were loaded with flavor by dripping the liquid flavor oil on the beads while stirring. Depending on the type of flavor, the process was carried out at room temperature if the flavor solvent was a liquid oil or at elevated temperatures if the solvent was solid fat. The beads were then allowed to stand for 1 hour till 5 days to allow complete absorption of the flavor oil. Depending on the flavor solvent in the beads and the flavor load, a more or less free flowing product was obtained in which the particles have sometimes a slight tendency to stick together due to the presence of some surface oil.

EXAMPLE 2

Sodium alginate (type Protanal LF 20/60 ex Pronova; 4.11 kg) was dissolved in tap water (150 kg) in a 500 L tank to produce a homogeneous aqueous solution. The solution was circulated to speed up the dissolution of the alginate. Capsul (2.25 kg) was added and stirring was continued till a homogeneous phase is obtained. Subsequently, miglyol (50 kg) was added to the solution and the two-phase mixture was emulsified in portions by vigorous stirring with an Ultra-Turrax. The emulsion, maintained at a temperature of 40° C., was sprayed on a Pilot BioSphere Sprayer (Landteknikk, Oslo, Norway) which is equipped with a rotating disk that contains specially designed holes for ejecting the emulsion in droplets of uniform size. The disk holes are 0.8 mm, the feed flow 1 kg/min and the disk speed 374 rpm. The size of the droplets depends on the viscosity of the emulsion and the speed of the rotation. The droplets were collected in 1200 kg of a solution of 1.6% calcium chloride dihydrate in water.

The beads were isolated by filtration. Prior to filtration, part of the slurry of beads was sieved in order to obtain a fraction of uniform particle size (diameter between 710 mm and 1000 mm) for comparative performance tests. The filtered gel beads were dried in a (vacuum) oven at 20° C. and loaded with flavor as described in Example 1. If the beads remained a little bit sticky after loading with flavor, additional starch was added to obtain a free flowing product.

EXAMPLE 3

This example is equivalent to Example 1 except for the coating with starch. Coating was carried out after filtration. The filtered gel beads moisture content 50–55%) were coated by mixing with corn starch (30 g per 100 g of wet beads). The resulting mixture was stirred or shaken till a free flowing product was obtained. Optionally, the beads were dried in a (vacuum) oven and loaded with flavor as described in Example 1. If the beads remained a little bit sticky after loading with flavor, additional starch was added to obtain a free flowing product.

EXAMPLE 4

This example is equivalent to Example 2 except for the isolation and drying of the gel beads. The gel beads were isolated by centrifugation (moisture content about 20%) and either:
a. coated with corn starch (250 g of corn starch per 1000 g of moist beads) without further drying, or
b. mixed with corn starch and dried directly in a fluid bed drier to yield a free flowing product.

Subsequently, the beads were loaded with flavor as described in example 1. If the beads remained a little bit sticky after loading with flavor, additional starch was added to obtain a free flowing product.

EXAMPLE 5

This example is equivalent to Example 1, except for the flavor solvent which was refined soy oil instead of miglyol.

EXAMPLE 6

This example is equivalent to Example 1, except for the following differences: hydrogenated palm kernel oil instead of miglyol was used as the flavor solvent and silicon dioxide (Hubersil 1714, ex J. M. Huber Corporation) was added as an adsorbent The temperature of the emulsion was maintained at 50° C. to keep the palm oil in melted form.

EXAMPLE 7

This example is equivalent to Example 3, except for the incorporation of gelatin in the gel matrix. The amount of gelatin used (Gelatine 280/300 Bloom ex Bovines) was 1 g/g of sodium alginate. The resulting slurry of beads was sieved to collect a fraction with a particle size of 710–1000 mm. Subsequently, the beads were:
a. filtered and dried as described in Example 2, or
b. filtered and incubated with glutaraldehyde to cross-link the gelatin.

The cross-linking was carried our by adding 76 g of filtered beads to 78 g of an aqueous 0.086% (w/w) solution of glutaraldehyde. The slurry was stirred overnight, and the beads were collected by filtration, coated with corn starch and dried in a vacuum oven at 1 mm Hg at a constant temperature of 20° C. Finally, the beads were loaded with flavor as described in Example 1.

EXAMPLE 8

This example is equivalent to Example 3, except for the use of pectin (type LM 1912 CSZ, Copenhagen Pectin) instead of sodium alginate. The pectin concentration in water is 3% compared to an sodium alginate concentration of 2%. The pectin was dissolved at 60° C. and then allowed to cool down to room temperature before starting droplet generation.

EXAMPLE 9

This example is equivalent to Example 1, except for the use of gellan gum (Kelcogel F, Kelco) instead of sodium alginate. The gellan gum concentration in water was 1.5% compared to an sodium alginate concentration of 2%. The gellan gum was dissolved at 50° C. and maintained at that temperature during droplet generation.

EXAMPLE 10

This example shows the effect of the moisture content of the alginate gel beads on the flavor retention in crackers during baking. The alginate beads were prepared according to Example 4 using sodium alginate type LF 20/60 L (Pronova). The flavor load (neat apple flavor without solvent) was 20%, calculated on dry weight basis, i.e. 1 part of flavor to 4 parts of dry uncoated beads.

The crackers were prepared according to the following recipe:

| Ingredient | Weight percent | Group |
| --- | --- | --- |
| Biscuit flour | 53.80 | A |
| Modified starch (C*top) | 3.00 | A |
| Tetra sodium pyrophosphate | 0.10 | A |
| Sodium bicarbonate | 0.20 | A |
| Dextrose | 2.50 | A |
| Skimmed milk powder | 4.00 | A |
| Salt | 1.50 | A |
| Monosodium glutamate | 0.40 | A |
| Lecithin M30 | 0.40 | A |
| Ammonium bicarbonate | 2.00 | C |
| Biskien soft (fat) | 9.00 | B |
| Sodium metabisulfite (10% in water) | 0.10 | D |
| Water | 23.00 | C |
| Flavor: | Variable* | B |
| Total: | 100.00 | |

*The dosage of unencapsulated flavor (neat flavor without solvent!) was 3.2 g/kg of dough or an equivalent amount of encapsulated flavor.

Mixing Procedure and Bake Conditions:

a. Mix the dry A ingredients in the Hobart mixer.
b. Melt the fat and add the flavor to the molten fat.
c. Add the molten fat with flavor to the mix of A ingredients.
d. Prepare solution of C ingredients.
e. Mix slowly the C ingredients with the mix of A + B ingredients in the Hobart bowl (1.30 min).
f. Add the D ingredient and mix slowly for 1 min, then fast till a temperature of 29–30° C. has been achieved.
g. Roll and laminate.
h. Cut the sheet into cracker forms.
i. Bake at 200° C. for 6–8 minutes.

The crackers were evaluated on smell (aroma perception by sniff) and "taste" (aroma perception by mouth). The results of the organoleptic evaluation (5 people) show that the performance of the encapsulated flavors increases with a decrease of the moisture content.

| | Particle Size (mm) | Intensity of aroma** by Sniff | Mouth |
| --- | --- | --- | --- |
| Unencapsulated flavor | | 4.50 | 3.88 |
| Alginate beads, 16% moisture | 1091 | 6.75 | 7.00 |
| Alginate beads, 2% moisture | 905 | 7.38 | 7.63 |

**Organoleptic scores:
3 = weak, flavor type difficult to recognize; 4 = weak, but flavor recognizable; 5 = Acceptable flavor strength, slightly too weak; 6 = Optimum flavor strength; 7 = Flavor slightly too strong; 8 = flavor much too strong; 9 = flavor extremely strong; burning sensation The results of the organoleptic analysis are in agreement with those of the chemical analysis which shows an increase of flavor retention with a decrease of the moisture content of the beads. The flavor retention was determined as the difference between the flavor concentrations in dough and cracker taking into account the loss of water during baking.

| | % Retained during baking | | |
| --- | --- | --- | --- |
| | Liquid | Encapsulated flavor | |
| Compound Name | flavor | 16% H$_2$O | 2% H$_2$O |
| Ethyl butyrate | 4.0 | 19.1 | 41.4 |
| tr-2-Hexenal | 5.7 | 24.5 | 52.4 |
| cis-3-Hexenol | 4.3 | 8.0 | 15.9 |
| Hexanol | 5.5 | 14.1 | 28.1 |
| Butyl Butyrate | 5.2 | 33.1 | 61.0 |
| 3-Methylbuthyl Butyrate | 7.2 | 28.7 | 62.8 |
| Linalool | 11.0 | 28.4 | 47.4 |
| Ethyl benzoate | 12.3 | 47.0 | 63.8 |
| Cis-3-hexenyl Butyrate | 13.7 | 32.9 | 71.8 |
| Ethyl octanoate | 15.6 | 29.8 | 75.6 |
| Borneol | 23.6 | 43.5 | 67.2 |

EXAMPLE 11

This example shows the effect of encapsulation on flavor retention during extrusion. Dry beads were prepared according to the method of Example 1, using alginate type FD 155 (Grindsted). The beads were loaded with apple flavor (2 g flavor per 8 g of dried beads). The performance of the encapsulated flavor in extruded cereals was compared with that of the unencapsulated liquid flavor oil.

The corn curls were prepared according to the following recipe:

| Ingredient | Weight |
| --- | --- |
| Corn grit | 2790 g |
| Water | 210.0 g |
| Salt | 30.0 g |
| Mono sodium glutamate | 12.0 g |
| Flavor | Variable* |
| Total | 3042.0 g |

*The dosage of unencapsulated flavor (neat flavor without solvent!) was 2.5 g/kg of grit or an equivalent amount of encapsulated flavor.

The flavor was mixed into the corn grit. The salt and mono-sodium glutamate were dissolved in the water and the resulting solution is added to the flavored corn grit. The mixture was extruded on a counter-rotating twin screw extruder (exit temperature: 85° C.), cut in small pieces and air dried.

The corn curls were evaluated on smell (aroma perception by sniff) and taste (aroma perception by mouth). The intensity of the smell is an indication for the amount of the flavor that has been released from the flavor beads into the product prior to consumption. The taste intensity is a measure for the total amount of flavor that was released from the product base and the flavor beads. The results of the organoleptic evaluation (average of 5 people) are shown below:

|  | Particle Size ($\mu$m) | Intensity of aroma** by Sniff | Mouth |
|---|---|---|---|
| Unencapsulated flavor |  | 2.80 | 5.20 |
| Encapsulated flavor | 1035 | 3.60 | 7.00 |

**see Example 10

These results are in agreement with the results of the chemical analysis:

|  | % Retained during extrusion | |
|---|---|---|
| Compound Name | Liquid flavor | Encaps. flavor |
| Ethyl butyrate | 10.9 | 83.9 |
| cis-3-Hexenol | 64.1 | 75.3 |
| Hexanol | 81.2 | 98.4 |
| Butyl Butyrate | 54.4 | 81.9 |
| 3-Methylbuthyl Butyrate | 70.5 | 88.0 |
| Linalool | 99.3 | 101.5 |

Since the retention of the unencapsulated flavor was already quite high, it was not possible to achieve a major improvement of flavor retention by encapsulation except for ethyl butyrate which was the most volatile compound in this flavor.

EXAMPLE 12

This experiment shows the effect of the flavor solvent on the performance of the alginate encapsulated flavor. Dry alginate beads were prepared by the method of Example 1 using alginate type FD 155 for the formation of the water insoluble matrix and either miglyol or refined soy oil as the flavor solvent. The performance of the flavors was evaluated in crackers as described in Example 10. The results of the organoleptic evaluation are shown below:

|  | Particle Size ($\mu$m) | Intensity of aroma** by Sniff | Mouth |
|---|---|---|---|
| Unencapsulated flavor |  | 3.20 | 3.70 |
| Alginate beads with miglyol | 982 | 6.40 | 6.90 |
| Alginate beads with soy oil, | 994 | 7.30 | 8.00 |

**see Example 10

The higher performance of alginate beads with soy oil has most likely to be attributed to the higher viscosity of the soy oil which reduces the rate of flavor volatilization during baking.

EXAMPLE 13

The alginate beads were prepared by spraying using a method similar to that of Example 2. The slurry of beads was fractionated by sieving to yield fractions of the following particle size: 0–250, 250–500, 500–1000 and 1000–2000 mm. After vacuum drying, the dry beads were loaded with apple flavor to yield flavored beads containing 20% of flavor. The performance of the encapsulated flavors was evaluated in crackers which were prepared as described in Example 10.

|  | Intensity of aroma** by | |
|---|---|---|
|  | Sniff | Mouth |
| Unencapsulated flavor | 5.25 | 4.75 |
| Encapsulated flavor, <250 $\mu$m | 5.75 | 4.50 |
| Encapsulated flavor, 250–500 $\mu$m | 4.88 | 5.50 |
| Encapsulated flavor, 500–1000 $\mu$m | 6.50 | 6.13 |
| Encapsulated flavor, 1000–2000 $\mu$m | 8.25 | 8.38 |

**see Example 10

The results of this experiment clearly demonstrate that performance of the alginate beads increases with increase of particle size.

EXAMPLE 14

The performance of dry pectin beads, prepared by the method of Example 8, was compared with that of dry alginate beads prepared according to the method of Example 3. The encapsulated flavor was apple and the application medium was crackers. The results of the organoleptic evaluation are shown below:

|  | Particle Size ($\mu$m) | Intensity of aroma** by Sniff | Mouth |
|---|---|---|---|
| Unencapsulated flavor |  | 4.25 | 4.00 |
| Alginate beads | 905 | 6.88 | 6.38 |
| Pectinate beads | 1057 | 7.75 | 7.25 |

**see Example 10

These results demonstrate that the performance of the calcium pectinate beads is about the same as the performance of the calcium alginate beads. The slightly better performance of the pectinate beads has probably to be attributed to their slightly larger particle size.

EXAMPLE 15

The performance of dry gellan gum beads, prepared by the method of Example 9, were compared with that of dry alginate beads prepared according to the method of Example 3. The flavor type was apple and the application medium was again crackers. The results of the organoleptic evaluation are as follows:

|  | Particle Size (μm) | Intensity of aroma** by | |
|---|---|---|---|
|  |  | Sniff | Mouth |
| Unencapsulated flavor |  | 4.13 | 4.13 |
| Alginate beads, type LF 20/60 L | 905 | 7.25 | 6.75 |
| Gellan gum beads | 957 | 6.63 | 6.00 |

**see Example 10

These results demonstrate that the performance of the calcium containing gellan gum beads is slightly less than that of the calcium alginate beads but still much better than that of the unencapsulated flavor.

EXAMPLE 16

The performance of dry gelatine/alginate beads, prepared by method b of Example 7, was compared with that of a dry standard alginate beads encapsulated apple flavor prepared according to the method of example 3. The encapsulated flavor was apple and the application medium was crackers. The results of the organoleptic evaluation are shown below:

|  | Particle Size (μm) | Intensity of aroma** by | |
|---|---|---|---|
|  |  | Sniff | Mouth |
| Unencapsulated flavor |  | 4.13 | 4.00 |
| Alginate/gelatin beads | 1047 | 7.50 | 7.13 |
| Alginate beads | 905 | 6.75 | 7.00 |

**see Example 10

The results of the organoleptic evaluation are confirmed by the results of the chemical analysis shown below:

|  | % Retained during baking | | |
|---|---|---|---|
|  |  | Encapsulated flavor | |
| Compound Name | Liquid flavor | Alginate | Gelatine/Alginate |
| Ethyl butyrate | 4.0 | 41.4 | 35.5 |
| Hexanol | 5.5 | 28.1 | 22.6 |
| Butyl Butyrate | 5.2 | 61.0 | 61.3 |
| 3-Methylbuthyl Butyrate | 7.2 | 62.8 | 75.5 |
| Linalool | 11.0 | 47.4 | 73.2 |
| Ethyl benzoate | 12.3 | 63.8 | 57.1 |
| Ethyl octanoate | 15.6 | 75.6 | 90.4 |

EXAMPLE 17

A cheese top note flavor, Gouda type, was encapsulated in dry alginate beads prepared by the method of Example 1 at a load of 20% (w/w). The encapsulated flavor was evaluated in crackers against the unencapsulated flavor as described in example 10. The results show that encapsulation results in a superior flavor performance:

|  | Particle Size (μm) | Intensity of aroma** by | |
|---|---|---|---|
|  |  | Sniff | Mouth |
| Unencapsulated flavor |  | 4.33 | 4.33 |
| Alginate beads | 830 | 7.67 | 7.42 |

**see Example 10

EXAMPLE 18

The performance of alginate encapsulated apple flavor was evaluated in pasta; different flavor solvents were used, miglyol and revel BEP which is a fractionated, hydrogenated, refined vegetable fat of non-lauric origin, slip melting point 43.0° C. (Loders Crocklaan).

The pasta was prepared according to the following recipe:

| Ingredients | % by weight | Grams per 500 g batch |
|---|---|---|
| Flour (Semolina) | 68.15 | 340.75 |
| Salt | 2.87 | 14.35 |
| Water | 28.98 | 144.90 |
| Total: | 100.00 | 500.00 |

Preparation:

1. Mix water and flavor in bottom bowl.
2. Premix flour and salt, and add to bowl.
3. Blend until a dough forms. Add additional water if needed to achieve desired consistency.
4. Step dough through pasta machine to make sheets.
5. Allow sheets to "toughen" for approximately 15 minutes
6. Cut sheets into strips.
7. Allow to dry at room temperature Boiling of Pasta For evaluation purposes, the dried pasta was boiled in plain boiling water for 8 minutes. No salt or oil was added. The results of the organoleptic evaluation, one week after the preparation of the pasta, are shown below.

|  | Particle Size (μm) | Intensity of aroma** by | |
|---|---|---|---|
|  |  | Sniff | Mouth |
| Unencapsulated flavor |  | 4.80 | 4.30 |
| Alginate beads with miglyol | 889 | 4.40 | 5.50 |
| Alginate beads with Revel BEP | 826 | 5.60 | 7.20 |

After storage in a cardboard box for 7 months at room temperature, the products were again evaluated with the following result:

|  | Particle Size (μm) | Intensity of aroma** by Sniff | Intensity of aroma** by Mouth |
|---|---|---|---|
| Unencapsulated flavor |  | 2.88 | 3.10 |
| Alginate beads with miglyol | 889 | 3.75 | 5.70 |
| Alginate beads with Revel BEP | 826 | 3.63 | 6.30 |

**see Example 10

The results show that flavor stability during storage is highest if the flavors are encapsulated. The differences are most pronounced during consumption (flavor perception by mouth). This suggests that the flavor is effectively encapsulated and that the encapsulation has a positive effect on the flavor release during consumption. Chemical analysis confirmed this conclusion. The differences in flavor concentration between the pastas are smaller than expected on the basis of the organoleptic evaluations. This suggests that part of the difference in flavor strength has to be attributed to improvement of flavor release.

|  | % Retained | Encapsulated flavor | |
|---|---|---|---|
| Compound Name | Liquid flavor | Miglyol | BEP |
| Ethyl butyrate | 15 | 37 | 17 |
| tr-2-Hexenal | 15 | 19 | 19 |
| cis-3-Hexenol | 12 | 16 | 12 |
| Hexanol | 20 | 26 | 24 |
| Butyl Butyrate | 34 | 53 | 58 |
| 3-Methylbuthyl Butyrate | 30 | 51 | 57 |
| Linalool | 41 | 54 | 54 |
| Borneol | 45 | 57 | 57 |
| Ethyl benzoate | 34 | 49 | 47 |
| Ethyl octanoate | 38 | 51 | 62 |
| cis-3-Hexenyl 2-methylbutyrate | 35 | 51 | 68 |
| β-Damascone | 39 | 52 | 68 |

EXAMPLE 19

Dry alginate beads prepared according to the method of Example 6 were loaded with 14.7% of a strawberry flavor. At this flavor load, the palm oil melts at 28–30° C. The particle size of the beads, measured in aqueous slurry, is 918 μm. The performance of the encapsulated flavor was evaluated in low fat ice cream against the free liquid flavor oil and a fat encapsulated flavor, prepared according to example 1 of U.S. Pat. No. 5,536,519. The level of strawberry flavor was maintained constant at 0.09% in all three products. The concentration of the encapsulated strawberry was adjusted to achieve the same level of active ingredients.

The composition of the low fat ice creams was as follows:

|  | Weight |
|---|---|
| Sugar | 90.00 |
| Topping base DP 40 (DMV Campina) | 34.00 |
| Sorbitol powder | 5.00 |
| CMC 9M 31 F (Hercules) | 1.00 |
| Carrageenan Genuvisco J (Copenhagen Pectin) | 1.00 |
| Skimmed milk powder | 19.00 |
|  | 150.00 |

The low fat ice creams were prepared using an Ott freezer. The dry ingredients were pre-weighed and blended, and this dry mix was added to 400 g of water. The new mixture was stirred for three minutes. Then the flavor was added and stirring was continued for another three minutes. The mixture was then allowed to set overnight in a freezer (−20° C.). The product was evaluated after 1 week.

The results of the organoleptic evaluation demonstrated that the performance of the free flavor oil is poor. The flavor has a sudden and sharp release and is unbalanced, whereas the encapsulated flavors are more balanced and have a richer and more lingering sensation. The flavor encapsulated in the alginate beads was preferred over the fat encapsulated flavor because it provided a richer flavor sensation.

EXAMPLE 20

Dry alginate beads are loaded with a mustard flavor (20% load) that contains allyl isothiocyanate as the active principle using the method of example 1. The loaded flavor beads are evaluated in chicken nuggets using the following recipe:

| Ingredients of adhesion batter | Weight % |
|---|---|
| Water | 67.00 |
| Batter mix N0004 NFI* | 33.00 |
| Total | 100.00 |

*Contains wheat flour, hydrocolloids, white of egg and salt.

Preparation of the Nuggets:

1. Prepare the batter by mixing batter mix into the water.
2. Add flavor (liquid flavor at 0.75 g/kg and encapsulated flavor at 3.3 g/kg of batter.
3. Dip chicken pieces into batter and remove immediately. The batter pick up is about 10%.
4. Flash fry for 30 seconds at 180° C.
5. Store the prefried chicken nuggets in the freezer (−20° C.).
6. Fry the nuggets for 5–6 minutes at 170° C. Please ensure that the temperature in the interior of the meat is higher than 75° C.

The nuggets were evaluated after storage for 1 week and 5 weeks in the freezer. The products were only evaluated on taste (flavor perception by mouth) because the flavor hardly had any smell but generated a strong burning sensation in the mouth.

| | Particle Size (μm) | Intensity of aroma** by Sniff | Mouth |
|---|---|---|---|
| Unencapsulated flavor | | 2.9 | 3.0 |
| Alginate beads | 994 | 7.4 | 7.1 |

**see Example 10

The results clearly demonstrate that the encapsulation protects the chemically unstable allyl isothiocyanate effectively against degradation and volatilization during frying and storage.

What is claimed is:

1. A method for flavoring and/or fragrancing a food product comprising adding to the food product a plurality of beads comprising a matrix of a reticulated multivalent cation containing acid polysaccharide and a non-flavor, non-fragrance lipophilic material, and at least one flavor and/or fragrance ingredient, the matrix defining a plurality of voids at least partly filled with the flavor and/or fragrance ingredient.

2. The method of claim 1 wherein the food product is heated.

3. The method of claim 2 wherein heating is by a method selected from the group consisting of drying, frying, baking, boiling, roasting, microwaving, and combinations thereof.

4. The method of claim 1 wherein the food product is subject to a high shear force.

5. The method of claim 1 wherein the food product is chewing gum.

6. The method of claim 1 wherein the food product is selected from the group consisting of a low fat food and a non-fat food.

7. A bead comprising a matrix of a reticulated multivalent cation containing acid polysaccharide to build at least one void in the matrix and a non-flavor, non-fragrance lipophilic material, and at least one active ingredient, the bead having a homogeneous composition and texture from inside to outside in which the active ingredient is uniformly dispersed, the active ingredient at least partly filling the void.

8. The bead of claim 7 wherein the active ingredient is selected from the group consisting of a flavor, a fragrance, a vitamin, a colorant, and combinations thereof.

9. The bead of claim 7 wherein the active ingredient is selected from the group consisting of a flavor oil and a flavor dissolved in oil.

10. The bead of claim 7 wherein the bead is heat stable.

11. The bead of claim 10 wherein the bead is stable to at least of drying, frying, baking, boiling, roasting, microwaving, and combinations thereof.

12. The bead of claim 7 wherein the bead is mechanically stable.

13. The bead of claim 7 having a diameter in the range of about 10–5000 μm.

14. A bead comprising a matrix of a reticulated multivalent cation containing acid polysaccharide, a non-flavor, non-fragrance lipophilic material, and an active ingredient selected from the group consisting of a fragrance, a flavor, and combinations thereof, the matrix defining a plurality of voids at least partly filled with the flavor and/or fragrance.

15. A bead comprising a matrix of a reticulated multivalent cation containing acid polysaccharide and a non-flavor, non-fragrance lipophilic material, and at least one active ingredient, said active ingredient at least partly filling a void built by the acid polysaccharide.

16. The bead of claim 15 wherein the active ingredient is selected from the group consisting of a water soluble solid, a volatile solid, a water soluble liquid, a volatile liquid and combinations thereof.

17. The bead of claim 15 wherein the active ingredient is selected from the group consisting of a flavor, a fragrance, a vitamin, a coloring material, and combinations thereof.

18. The bead of claim 17 wherein the active ingredient is selected from the group consisting of a flavor oil and a flavor dissolved in oil.

19. The bead of claim 15 wherein said acid polysaccharide is selected from the group consisting of an alginate, a pectin, a gellan gum and combinations thereof.

20. The bead of claim 15 wherein the bead is heat stable.

21. The bead of claim 15 wherein the active ingredient is sustainedly released.

22. The bead of claim 15 wherein the bead is mechanically stable.

23. The bead of claim 15 having a diameter in the range of about 10–5000 μm.

24. The bead of claim 15 wherein said process to produce said bead further comprises a step selected from the group consisting of adding at least one water dispersible substance to form said discrete droplets, drying said isolated beads and combinations thereof.

25. The bead of claim 15 having a diameter in the range of about 100–1500 μm.

26. The bead of claim 15 having a diameter in the range of about 400–1200 μm.

* * * * *

UNITED STATES PATENT AND TRADEMARK OFFICE
CERTIFICATE OF CORRECTION

PATENT NO. : 6,929,814 B2  Page 1 of 1
DATED : August 16, 2005
INVENTOR(S) : Bouwemeesters et al.

It is certified that error appears in the above-identified patent and that said Letters Patent is hereby corrected as shown below:

<u>Column 4,</u>
Line 42, "...the moist beads are dried/in the presence of..." should be -- ...the moist beads are dried in the presence of... --.

<u>Column 5,</u>
Line 6, "...or modifying the-flavor..." should be -- ...or modifying the flavor... --.

<u>Column 9,</u>
Line 42, "...impact in a wide, variety of..." should be -- ...impact in a wide variety of... --.
Line 45, "...matrix may-be used to..." should be -- ...matrix may be used to... --.

<u>Column 22,</u>
Lines 2-3, "...is stable to at least of drying, frying, baking..." should be -- ...is stable to at least one of drying, frying, baking... --.
Line 40, "...wherein said process to produce said bead further..." should be -- ...wherein a process to produce said bead further... --.

Signed and Sealed this

Fourth Day of April, 2006

JON W. DUDAS
*Director of the United States Patent and Trademark Office*